(12) United States Patent
White

(10) Patent No.: US 8,472,599 B1
(45) Date of Patent: Jun. 25, 2013

(54) ELECTRONIC DEVICE FOR BLOCKING TELEPHONE CALLS

(76) Inventor: Leebert White, Brooklyn, NY (US)

( * ) Notice: Subject to any disclaimer, the term of this patent is extended or adjusted under 35 U.S.C. 154(b) by 283 days.

(21) Appl. No.: 12/807,929

(22) Filed: Sep. 16, 2010

Related U.S. Application Data

(63) Continuation-in-part of application No. 11/210,208, filed on Aug. 23, 2005, now abandoned.

(60) Provisional application No. 60/604,247, filed on Aug. 24, 2004.

(51) Int. Cl.
*H04M 1/56* (2006.01)
*H04M 15/06* (2006.01)
*H04M 3/42* (2006.01)

(52) U.S. Cl.
USPC ............. 379/142.02; 379/142.13; 379/210.02

(58) Field of Classification Search
USPC ............. 379/142.01, 142.02, 142.04–142.06, 379/142.13, 142.17, 201.11, 207.15, 210.02, 379/210.03, 373.03
See application file for complete search history.

(56) References Cited

U.S. PATENT DOCUMENTS

| | | | |
|---|---|---|---|
| 5,033,076 A | 7/1991 | Jones et al. | |
| 5,228,080 A | 7/1993 | Nutter et al. | |
| 5,644,629 A * | 7/1997 | Chow | 379/142.07 |
| 5,995,603 A * | 11/1999 | Anderson | 379/142.05 |
| 6,026,152 A | 2/2000 | Cannon et al. | |
| 6,178,232 B1 | 1/2001 | Latter et al. | |
| 6,459,780 B1 | 10/2002 | Wurster et al. | |
| 6,618,473 B1 | 9/2003 | Davis | |
| 7,860,230 B2 * | 12/2010 | Martin | 379/210.02 |
| 2002/0009184 A1 | 1/2002 | Shnier | |
| 2004/0086101 A1* | 5/2004 | Katz | 379/210.02 |
| 2004/0131164 A1* | 7/2004 | Gould | 379/88.19 |
| 2005/0185784 A1* | 8/2005 | Chiu et al. | 379/210.02 |

* cited by examiner

*Primary Examiner* — Quoc D Tran
(74) *Attorney, Agent, or Firm* — Emery L. Tracy

(57) ABSTRACT

An electronic device for use in conjunction with a telephone line. The electronic device is a standard caller identification connection that has an extra computer chip which disconnects incoming telephone calls in which the caller's identity can not be ascertained.

9 Claims, 3 Drawing Sheets

ELECTRONIC DEVICE FOR BLOCKING TELEPHONE CALLS

The present application is a continuation-in-part of U.S. patent application Ser. No. 11/210,208, filed Aug. 23, 2005 now abandoned, entitled "Electronic Device for Blocking Telephone Calls", which claims the benefit of U.S. Provisional Patent Application Ser. No. 60/604,247, filed Aug. 24, 2004 entitled "Your Identity Please".

BACKGROUND OF THE INVENTION

1. Field of the Invention

This invention relates generally to an electronic device and, more particularly, the invention relates to a new and improved electronic device for use in conjunction with a telephone line.

2. Description of the Prior Art

U.S. Pat. No. 5,033,076, issued to Jones, discloses a telephone privacy system with an option to allow calls only from callers having their numbers displayed.

U.S. Pat. No. 6,178,232, issued to Latter, discloses a telephone system capable of determining if the standard caller identification information is unavailable, incomplete or being blocked and prompts the caller to provide the information.

U.S. Pat. No. 6,459,780, issued to Wurster, discloses a telephone screening system allowing a caller to speak their information when caller id information is blocked.

SUMMARY

The present invention concerns that of a new and improved electronic device for use in conjunction with a telephone line. The electronic device is a standard caller identification connection that has an extra computer chip which disconnects incoming telephone calls in which the caller's identity can not be ascertained.

There has thus been outlined, rather broadly, the more important features of a caller identification which disconnects calls with unknown identities that the detailed description thereof that follows may be better understood and in order that the present contribution to the art may be better appreciated. There are, of course, additional features of the caller identification which disconnects calls with unknown identities that will be described hereinafter and which will form the subject matter of the claims appended hereto.

In this respect, before explaining at least one embodiment of the caller identification which disconnects calls with unknown identities in detail, it is to be understood that the caller identification which disconnects calls with unknown identities is not limited in its application to the details of construction and to the arrangements of the components set forth in the following description or illustrated in the drawings. The caller identification which disconnects calls with unknown identities is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present caller identification which disconnects calls with unknown identities. It is important, therefore, that the claims be regarded as including such equivalent constructions insofar as they do not depart from the spirit and scope of the present invention.

It is therefore an object of the present invention to provide a caller identification which disconnects calls with unknown identities which has all of the advantages of the prior art and none of the disadvantages.

It is another object of the present invention to provide a caller identification which disconnects calls with unknown identities which may be easily and efficiently manufactured and marketed.

It is another object of the present invention to provide a caller identification which disconnects calls with unknown identities which is of durable and reliable construction.

It is yet another object of the present invention to provide a caller identification which disconnects calls with unknown identities which is economically affordable and available for relevant market segment of the purchasing public.

Other objects, features, and advantages of the present invention will become more readily apparent from the following detailed description of the preferred embodiment when considered with the attached drawings and appended claims.

DETAILED DESCRIPTION OF THE PREFERRED EMBODIMENTS

Figure 1:
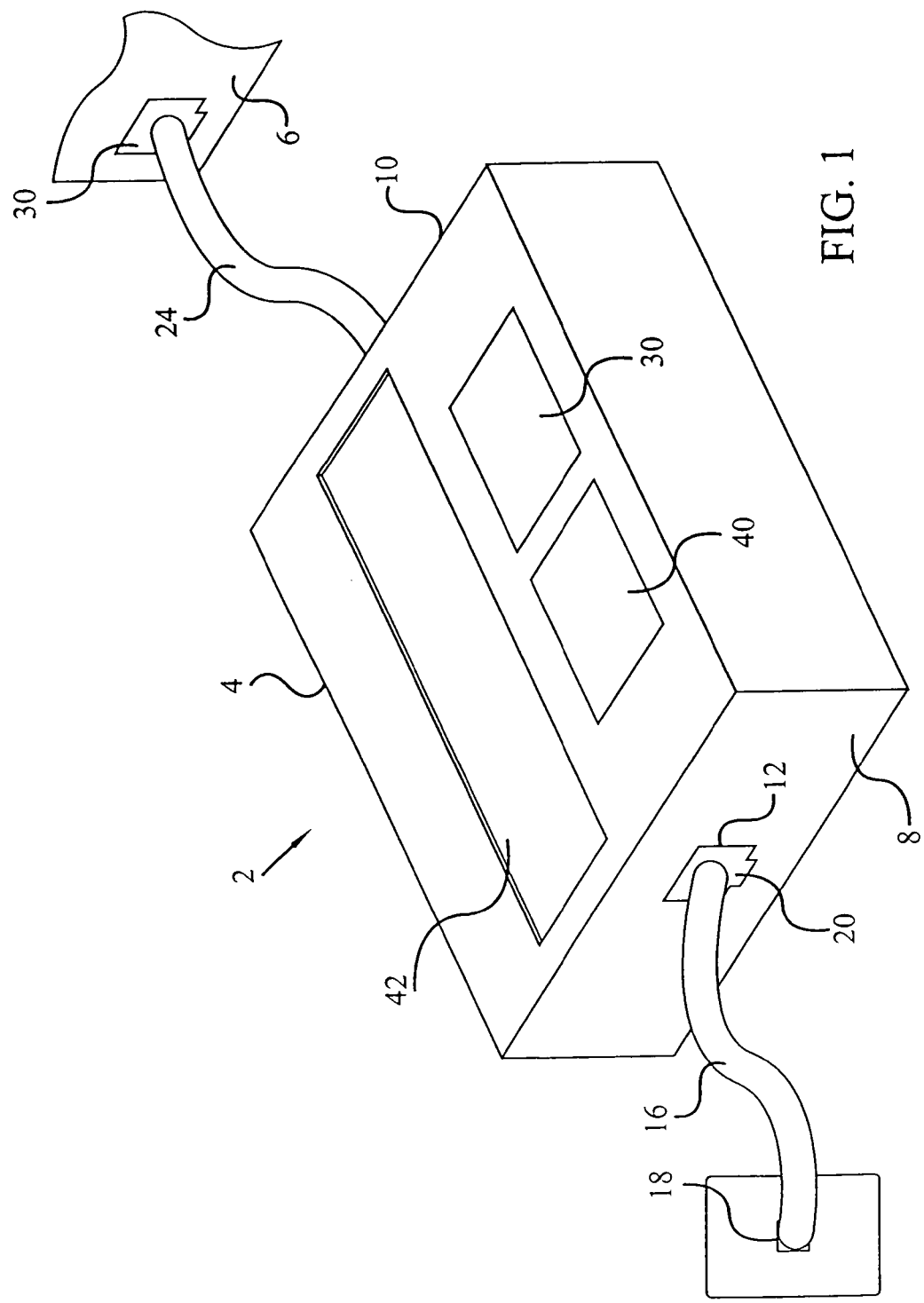
FIG. 1 is a front perspective view illustrating an electronic device for blocking telephone calls, constructed in accordance with the present invention, showing the first end of the central unit.
Figure 2:
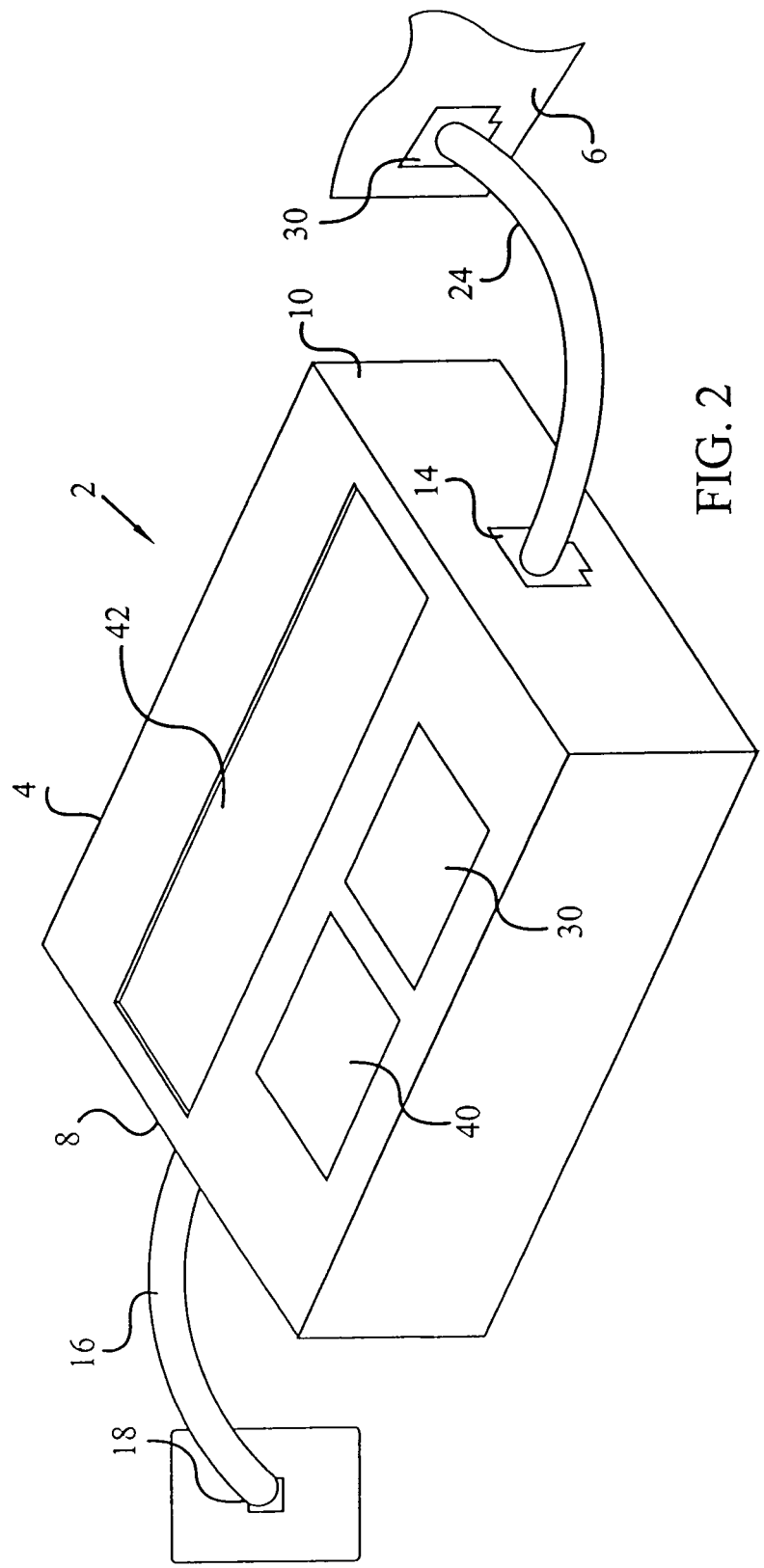
FIG. 2 is a front perspective view illustrating the electronic device for blocking telephone calls, constructed in accordance with the present invention, showing the second end of the central unit.

FIG. 1 shows a perspective view of the present invention showing the first end of the central unit 4, while FIG. 2 shows a perspective view of the present invention showing the second end of the central unit 4. The present invention comprises a call blocking system 2 that works when a central unit 4 analyzes incoming telephone calls and attempts to use traditional "caller ID" methods to identify the caller. If the central unit 4 quickly determines that the caller has or is electronically blocking their telephone number so their identity can not be ascertained with a traditional caller identification system, then the call blocking system 2 will automatically disconnect the incoming caller's telephone call and it will never cause the associated telephone to ring at all.

Central unit 4 of call blocking system 2 has two ends comprising a first end 8 and a second end 10. The first end of the central unit 2 has input slot 12, while the second end of the central unit 2 has an output slot 14. Both input slot 12 and output slot 14 are designed to be capable of receiving a telephone jack.

Connected to the input slot 12 is incoming telephone line 16, which has two ends, a first end and a second end. The first end of the incoming telephone line 16 is connected to a wall input 18, while the second end of the incoming telephone line 16 is connected to the input slot 12 via a telephone jack 20.

Connected to the output slot 14 is outgoing telephone line 24, which has two ends, a first end and a second end. The first end of the outgoing telephone line 24 is connected to output slot 14, while the second end of the outgoing telephone line 24 is connected to a telephone 6 via a telephone jack 30.

Within central unit 4 are located at least two separate computer chips that are used have the call blocking system function properly. Caller identification chip 40 performs standard identification functions that are present in everyday caller identification mechanisms. When an incoming caller calls the telephone 6, the telephone call gets routed through the central unit 4, where caller identification chip 40 attempts to identify the incoming caller. If successful, the caller identification chip 40 will cause the incoming caller's information to be displayed on a top-mounted display 42 that is located on the central unit 4.

Working in conjunction with caller identification chip 40 is anonymous blocking chip 50. If caller identification chip 40 is unable to detect the identity of the incoming caller for any reason, then it will activate the anonymous blocking chip 50, which will then proceed to disconnect the incoming phone call. Unlike a conventional unit that presents the incoming caller with a busy or off-hook condition, with the present invention, the incoming caller does not receive a "busy" signal or any other signal that is present with an off-hook condition. The incoming caller is automatically disconnected without any notice or sound.

In an embodiment of the present invention, an additional feature can be added to the present invention. This feature allows incoming callers calling from private or blocked numbers the option of having their numbers unblocked and their calls to proceed without being disconnected. In order for their calls to be processed and received by the party on the receiving end of the line, the incoming caller can choose to have their identity revealed so that their incoming call can be processed. If they choose not to reveal their identity, the incoming call will be immediately terminated.

Figure 3:
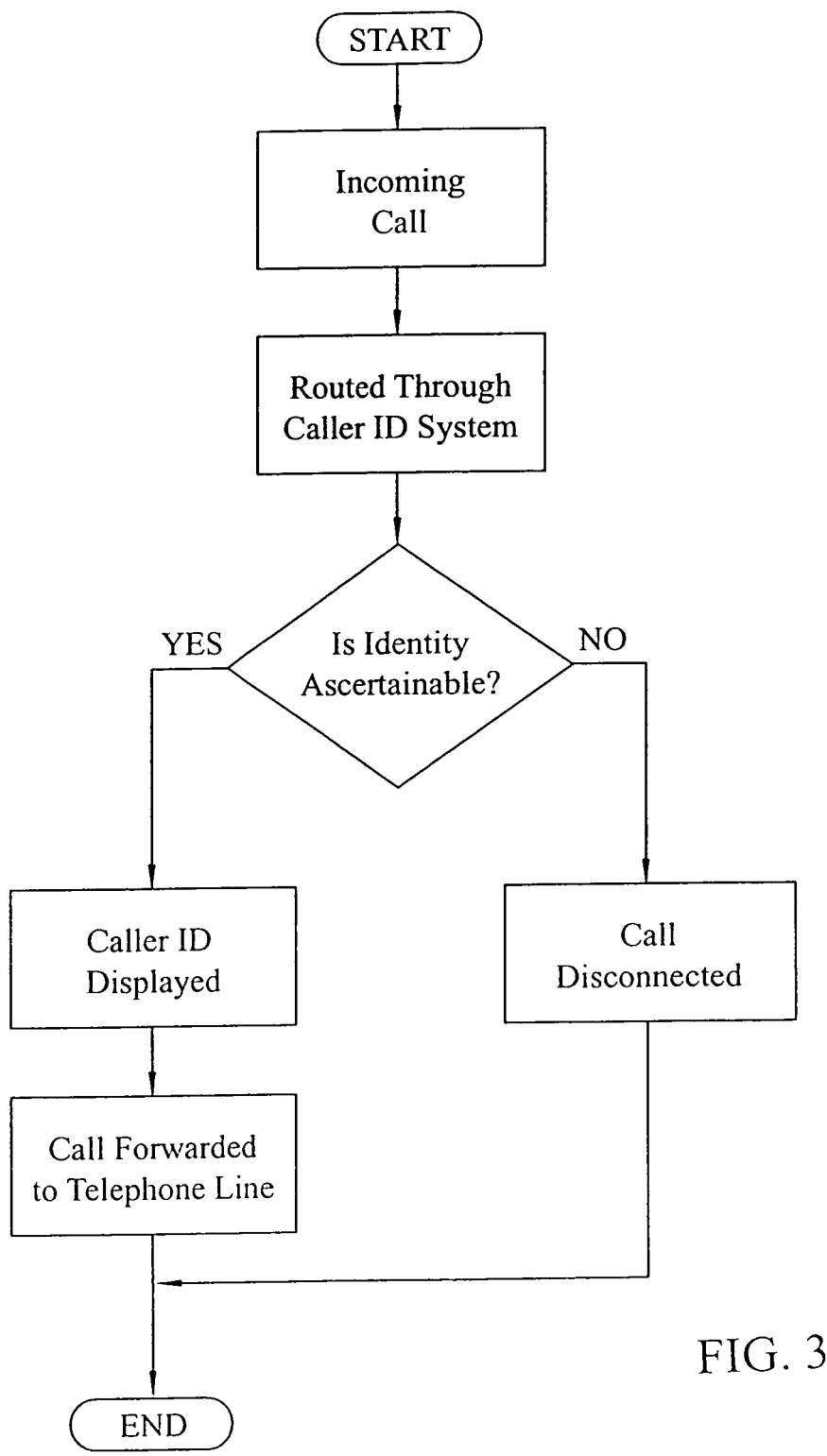
FIG. 3 is a schematic view of how the electronic device for blocking telephone calls, constructed in accordance with the present invention, works electronically when receiving a telephone call.

FIG. 3 shows a schematic view of how the present invention would work electronically when receiving a telephone call.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A telephone caller identification and blocking apparatus comprising:
    a central unit having a first end and a second end;
    an input slot attached to the first end of the central unit, the input slot capable of receiving a telephone jack;
    an output slot attached to the second end of the central unit, the output slot capable of receiving a telephone jack;
    an incoming telephone line having a first end and a second end, the first end of the incoming telephone line being connected to a wall input, the second end of the incoming telephone line being connected to the input slot;
    an outgoing telephone line having a first end and a second end, the first end of the outgoing telephone line being connected to the output slot, the second end of the outgoing telephone line being connected to a telephone;
    means for identifying incoming callers that call the telephone to which the central unit and the telephone are attached; and
    means for automatically disconnecting unidentified incoming phone calls through the means for identifying incoming callers that call the telephone to which the central unit and the telephone are attached, the means for disconnecting mounted within the central unit;
    wherein the unidentified phone call is disconnected without any sound or other audible off-hook warning to the incoming caller.

2. A telephone caller identification and blocking apparatus according to claim 1 wherein the means for identifying incoming callers that call the telephone to which the central unit and the telephone are attached further comprises:
    a caller identification computer chip located in the central unit; and
    a display located on the central unit;
    wherein the caller identification computer chip, upon learning the identification of an incoming caller calling the phone line to which the central unit and the telephone are attached, will display the caller identification information on the display.

3. A telephone caller identification and blocking apparatus according to claim 2 wherein the means for disconnecting incoming phone calls that can not be identified through the means for identifying incoming callers that call the telephone to which the central unit and the telephone are attached further comprises:
    an anonymous caller blocking chip located within the central unit;
    wherein the anonymous caller blocking chip will disconnect, an incoming telephone call if the caller identification computer chip is unable to detect the identify of an incoming caller for any reason.

4. A telephone caller identification and blocking apparatus comprising:
    a central unit having a first end and a second end;
    an input slot attached to the first end of the central unit, the input slot capable of receiving a telephone jack;
    an output slot attached to the second end of the central unit, the output slot capable of receiving a telephone jack;
    an incoming telephone line having a first end and a second end, the first end of the incoming telephone line being connected to a wall input, the second end of the incoming telephone line being connected to the input slot;
    an outgoing telephone line having a first end and a second end, the first end of the outgoing telephone line being connected to the output slot, the second end of the outgoing telephone line being connected to a telephone;
    means for identifying incoming callers that call the telephone to which the central unit and the telephone are attached; and
    means for automatically disconnecting unidentified incoming phone calls through the means for identifying incoming callers that call the telephone to which the central unit and the telephone are attached, the means for disconnecting mounted within the central unit;
    wherein the means for automatically disconnecting unidentified incoming phone calls provides the incoming call the option of identifying themselves prior to disconnecting; and
    wherein upon failure to identify, the means for automatically disconnecting disconnects the unidentified phone call without any further sound or other audible off-hook warning to the incoming caller.

5. A telephone caller identification and blocking apparatus according to claim 4 wherein the means for identifying incoming callers that call the telephone to which the central unit and the telephone are attached further comprises:
- a caller identification computer chip located in the central unit; and
- a display located on the central unit;
- wherein the caller identification computer chip, upon learning the identification of an incoming caller calling the phone line to which the central unit and the telephone are attached, will display the caller identification information on the display.

6. A telephone caller identification and blocking apparatus according to claim 4 wherein the means for disconnecting incoming phone calls that can not be identified through the means for identifying incoming callers that call the telephone to which the central unit and the telephone are attached further comprises:
- an anonymous caller blocking chip located within the central unit;
- wherein the anonymous caller blocking chin will disconnect an incoming telephone call if the caller identification computer chip is unable to detect the identify of an incoming caller for any reason.

7. A method for identifying and blocking telephone calls, the method comprising:
- providing a central unit having a first end and a second end;
- attaching an input slot to the first end of the central unit;
- attaching an output slot to the second end of the central unit;
- providing an incoming telephone line having a first end and a second end;
- connecting the first end of the incoming telephone line to a wall input;
- connecting the second end of the incoming telephone line to the input slot;
- providing an outgoing telephone line having a first end and a second end;
- connecting the first end of the outgoing telephone line to the output slot;
- connecting the second end of the outgoing telephone line to a telephone;
- identifying incoming callers that call the telephone to which the central unit and the telephone are attached;
- from within the central unit, automatically disconnecting unidentified incoming phone calls through the means for identifying incoming callers that call the telephone to which the central unit and the telephone are attached; and
- disconnecting the unidentified phone call without any sound or other audible off-hook warning to the incoming caller.

8. The method of claim 7 and further comprising:
- locating a caller identification computer chip the central unit;
- locating a display on the central unit;
- learning the identification of an incoming caller calling the phone line to which the central unit and the telephone are attached;
- displaying the caller identification information on the display.

9. The method of claim 7 and further comprising:
- locating an anonymous caller blocking chip within the central unit;
- disconnecting an incoming telephone call if the caller identification computer chip is unable to detect the identify of an incoming caller for any reason.

* * * * *